United States Patent [19]

Zemanek

[11] 4,302,831
[45] Nov. 24, 1981

[54] METHOD AND CIRCUIT ARRANGEMENT FOR CLOCK SYNCHRONIZATION IN THE TRANSMISSION OF DIGITAL INFORMATION SIGNALS

[75] Inventor: Josef Zemanek, Munich, Fed. Rep. of Germany

[73] Assignee: Siemens Aktiengesellschaft, Berlin and Munich, Fed. Rep. of Germany

[21] Appl. No.: 160,504

[22] Filed: Jun. 18, 1980

[30] Foreign Application Priority Data

Jun. 20, 1979 [DE] Fed. Rep. of Germany ....... 2924922

[51] Int. Cl.³ .......................... H04B 3/36; H04L 7/08
[52] U.S. Cl. ...................................... 375/111; 375/20; 375/118; 375/119; 370/100; 371/42; 371/47
[58] Field of Search ............... 375/111, 106, 108, 118, 375/119, 121, 20; 370/74, 98, 100; 371/42, 46, 47; 328/55, 63, 72

[56] References Cited

U.S. PATENT DOCUMENTS

| | | | |
|---|---|---|---|
| 3,745,248 | 7/1973 | Gibson | 375/118 |
| 3,959,589 | 5/1976 | von Roesgen | 375/118 |
| 4,213,007 | 7/1980 | Funk | 375/118 |

Primary Examiner—Thomas A. Robinson
Assistant Examiner—Donnie L. Crosland
Attorney, Agent, or Firm—Spellman, Joel & Pelton

[57] ABSTRACT

A method and a circuit arrangement for clock synchronization in the transmission of digital information signals. In the four-wire type transmission of blocks of information signals on a two-wire transmission line it is determined, by phase comparison, whether the first bit in each block of signals (1) falls within a time interval derived from the bit clock signal of the local clock generator; (2) falls within an adjacent time interval or (3) falls within none of such time intervals. Depending upon the results of this comparison, the time relationships are left unchanged, the period of the clock generator is shortened or lengthened one or more times, or a one-time, initial phase equality is established.

5 Claims, 3 Drawing Figures

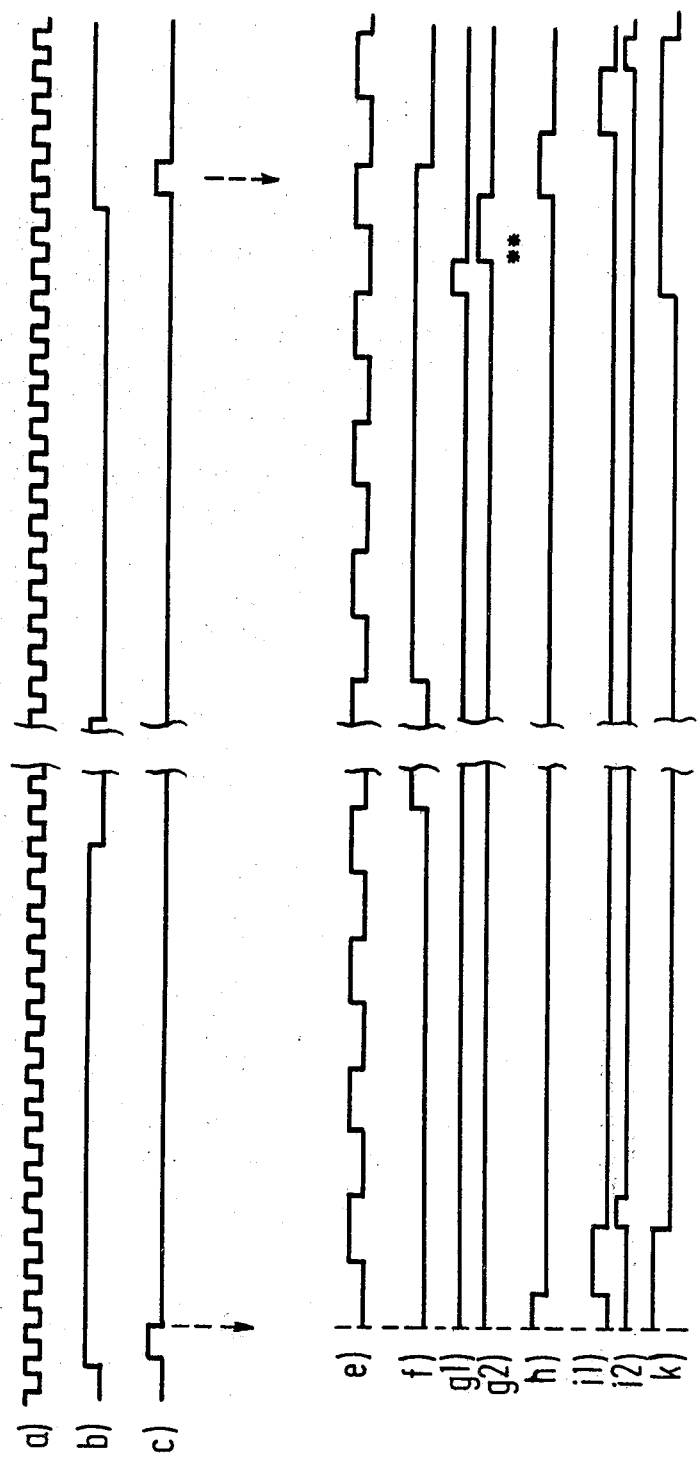

METHOD AND CIRCUIT ARRANGEMENT FOR CLOCK SYNCHRONIZATION IN THE TRANSMISSION OF DIGITAL INFORMATION SIGNALS

BACKGROUND OF THE INVENTION

The present invention relates to a method for clock synchronization in the transmission of digital information signals on two-wire transmission lines between a superordinate system, in particular a PCM time multiplex exchange, and a subordinate system, in particular a digital subscriber station. The digital information signals take the form of message signal blocks comprising at least one message signal word and a prefixed synchronization word. The clock generators which determine the time relationship of the superordinate and subordinate systems operate plesiochronously (close in time) to each other. In this mode the subordinate system periodically repeats an odd number of directly succeeding time periods or intervals which are derived from the bit cycle of the clock signal produced by the subordinate system clock generator. The one time interval located in the middle of this succession of time periods coincides with an edge of the bit clock pulse sequence. A "receive pulse" is then derived from the pulse edge of one of the bits of the message signal blocks received from the superordinate system, and a phase comparison is made to determine whether this receive pulse falls into one of the mentioned time intervals.

In above described transmission of digital message signals in the form of message signal blocks, it is necessary, first of all, to receive these blocks correctly in time. In order to effect this synchronization a synchronization word is sent to the subordinate system with each message signal block. Provision must be made, in this connection, to prevent a simulation of the synchronization word, either by message signal bit combinations occurring over a protracted period of time or disturbances occurring during the receiving time periods of the respective systems, from leading to a mis-synchronization.

In addition to the message block synchronization, however, it is also necessary to effect a clock synchronization. In the above noted mode of operation problems may arise because the clock information must be derived in the subordinate system from the incoming digital information signals. A separate transmission of the clock is not provided. If the message signal blocks for the two transmission directions are transmitted alternately, such a clock may be derived in the subordinate system only during a part of the transmit/receive period (namely, during the receive period) and therefore the remaining part of transmit/receive period (the transmit period) as well as the pause interval must be bridged by the synchronization circuit.

There are two situations in which the digital information signals received at a subordinate system will be out of phase with the locally generated clock signal: phase deviations caused by imprecise synchronization of the clock generators in the superordinate and subordinate systems, and also brief phase fluctuations caused by disturbances in transmission. Unlike the first-mentioned phase deviations, the phase fluctuations are not cumulative; consequently, they should be disregarded in the clock synchronization, if they do not exceed a certain magnitude, and should not lead to a readjustment of the phase relationships.

It has therefore been proposed, as indicated above, to derive a succession of time periods or intervals in the subordinate system from the bit clock fixed by the clock generator, and to derive a "receive pulse" from the bits of the message signal blocks received from the superordinate system. A phase comparison is then undertaken to determine whether the receive pulse falls into one of these time periods. According to the proposed method, all bits of one binary value of the message signal blocks are utilized in the derivation of the receive pulse. If only small phase fluctuations are involved, the decision whether or not to make a phase correction is made dependent upon the number of deviations found within a given transmit/receive period. In this way the precision of the synchronization method depends upon the number of bits of the one value ("0" or "1") from which the receive pulses are derived. Especially when the message signal blocks do not contain stochastic information, but serve to transmit slowly changing data, they may lead to inaccuracies in synchronization.

It is, therefore, an object of the present invention to provide a clock synchronization method which is independent of the message content of the information blocks. It is a further object of the present invention to provide a synchronization method which may be adapted, with minimal expense, to all cases of operation which lie between the one extreme case wherein the frequency deviations between the clock generators of the superordinate and subordinate systems are relatively great while the instantaneous phase fluctuations are small, and the other case wherein, although the clock generators have a high frequency constance, the phase fluctuations independent of their mode of operation are considerable.

SUMMARY OF THE INVENTION

The above noted objects, as well as other objects which will become apparent from the discussion that follows, are achieved, according to the present invention, by means of a method, carried out at the subordinate system, comprising the following steps:

(a) deriving a periodically repeating time group comprising an odd number of directly succeeding time intervals from the bit clock signal of the subordinate system, the time interval occurring at the center of the time group coinciding with a pulse edge of the bit clock signal;

(b) repeatedly deriving a receive pulse from the pulse edge of the first bit of the synchronization words in the message signal blocks received at the subordinate system;

(c) repeatedly determining by phase comparison whether the current receive pulse coincides with one of the time intervals; and (d) (1) if a prescribed number of successive receive pulses fail to coincide with any of the mentioned time intervals, establishing an initial phase equality between the bit clock signal of the subordinate system and the receive pulses;

(d) (2) if a receive pulse coincides with the middle time interval of a time group, leaving the phase of the bit clock signal unchanged;

(d) (3) if a receive pulse coincides with the time interval directly preceding the middle time interval of a time group, shortening the pulse period of the bit clock signal once, and if the next following receive pulse also coincides with the time interval directly preceding said middle time interval of the next following time group, shortening the pulse period of the bit clock signal twice within a transmission period;

(d) (4) if a receive pulse coincides with the time interval directly following the middle time interval of a time group, lengthening the pulse period of the bit clock signal once, and if the next following receive pulse also coincides with the time interval directly following said middle time interval of the next following time group, lengthening the pulse period of the bit clock signal twice with a transmission period;

(d) (5) if a receive pulse coincides with one of the time intervals indirectly preceding the middle time interval of a time group, shortening the pulse period of the bit clock signal at least three times within a transmission period upon the first detection of such a phase relationship, the number of times depending upon which one of the time intervals the receive pulse coincides with; and (d) (6) if a receive pulse coincides with one of the time intervals indirectly following the middle time interval of a time group, lengthening the pulse period of the bit clock signal at least three times within a transmission period upon the first detection of such a phase relationship, the number of times depending upon which one of the time intervals the receive pulse coincides with.

By limitation of the evaluation to the first bit of the synchronization word, which in most telecommunication systems is a 1-bit, the method according to the invention acts independently of the number of 1-bits in the remaining part of a message signal block. In this method, moreover, the synchronization is referred to that bit of the message signal block which is least affected by those phase fluctuations which should be disregarded in the synchronization. Therefore, the middle time interval, within the group of time intervals which indicates the range within which phase deviations remain without correction, can be kept relatively small. Finally by producing different reactions to the individual phase comparison results, namely as a function of the magnitude of the phase deviation and of the prior history of the phase comparison (whether or not a phase correction had taken place before), the method provides extensive flexibility with respect to the different operative cases mentioned above.

The present invention also contemplates a circuit arrangement for carrying out the method just described. In this circuit arrangement, the means for deriving the receive pulse includes a device for deriving an intermediate receive pulse from a pulse edge of the bits of the message signal block; a device for producing a timing signal in synchronism with the first bit of each synchronization word; and a coincidence gate for producing the receive pulse upon simultaneous occurrence of the intermediate receive pulse and the aforementioned timing signal. The phase comparator of the synchronization circuit includes a number of coincidence gates, each having a first and a second input and an output, and a NOR gate connected to the output of each of these coincidence gates. The first input of each coincidence gate is connected to the output of the aforementioned coincidence gate which produces the receive pulse. The second input of each coincidence gate receives a different one of the time pulses representing the different time intervals.

The evaluating logic in the circuit arrangement according to the invention receives signals from the phase comparator and produces separate outputs which effect the appropriate clock synchronization at the subordinate system. According to the invention, this evaluating logic includes three shift registers and three coincidence gates connected as follows:

A first shift register has a series input connected to the aforementioned NOR gate and has at least two stages. The distance in the register between the two stages depends upon the number of synchronization words which are to be received before establishing the initial phase equality. A first coincidence gate, having two inputs connected to the outputs of the two stages of the first shift register, produces a signal for effecting the initial phase equality. A second and third shift register each have a series input connected to the output of one of the coincidence gates which receives a time pulse representing a time interval either directly preceding or following the middle time interval. These shift registers also have at least two stages. The output of the first stage effects a one-time shortening or lengthening of the pulse period of the bit clock signal whereas the output of the second stage is connected to a coincidence gate as follows: A second and third coincidence gate each has two inputs connected to the outputs of the two stages of the second and third shift registers, respectively. The outputs of these gates effect a two-time shortening or lengthening of the pulse period of the bit clock signal upon receipt of signals at both inputs.

Finally, first and second additional outputs are each connected to one of the coincidence gates which receive time pulses representing a time interval indirectly preceding or following the middle time interval, respectively. The outputs of these gates each effect a three-time shortening or lengthening of the pulse period of the bit clock signal.

The above-noted circuit arrangement according to the invention has the advantage that it can be readily realized as an integrated circuit.

For a full understanding of the present invention, reference should now be made to the following detailed description of one preferred embodiment of the invention and to the accompanying drawing.

BRIEF DESCRIPTION OF THE DRAWING

FIG. 3 is a timing diagram illustrating the time relationships of digital pulses in the circuit arrangement according to FIGS. 1 and 2.

DESCRIPTION OF THE PREFERRED EMBODIMENTS

Figure 1:
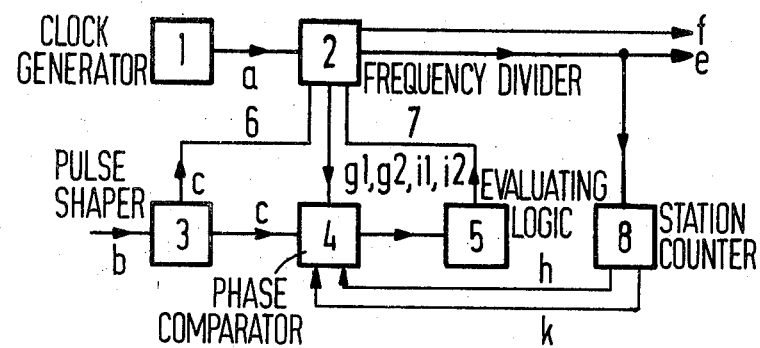
FIG. 1 is a block diagram of a circuit arrangement for carrying out the method according to the invention.

The circuit arrangement shown in FIG. 1 includes a clock generator 1 which determines the time relationships in the subordinate system and which operates, for example, at a clock frequency of 8.192 MHz. The clock output signal a from this clock generator is shown on line (a) in FIG. 3.

The clock signal a is divided down (e.g., by 32) to a bit clock signal f by means of a frequency divider 2. This bit clock signal underlies the information transmission on the two-wire transmission line which connects the subordinate system with a superordinate system. The bit clock signal, which may be 256 kHz for example, is shown on line (f) in FIG. 3.

The clock signal a is also divided down (e.g. by 4) to a clock signal e by the frequency divider 2, as illustrated on line (e) in FIG. 3. This clock signal e is passed to a station counter 8 whose function will be described below.

The frequency divider 2 is utilized also for deriving groups of periodically repeating, directly succeeding time pulses from the clock signal a and the bit clock f. These sequential time pulses are represented in FIG. 3—in lines (g1) to (i2). The number of time intervals marked by such a time pulse group is preferably odd so that the time pulse (representing a time interval) lying in the middle of a group—per line (h) in FIG. 3 is flanked on both sides, in time, by the same number of pulses; e.g. two in this case. This middle time pulse is located in time so that it always coincides with an edge of the bit clock pulse f, per line (f) in FIG. 3.

In the present case there belong to such a group of time pulses two further time pulses—per lines (g1) and (g2), respectively, in FIG. 3—indirectly and directly preceding the middle time pulse h as well as two time pulses directly and indirectly following the middle time pulse h—per lines (i1) and (i2), respectively, in FIG. 3.

A pulse shaper or former 3 in the circuit arrangement shown in FIG. 1, receives the digital information signal b from the superordinate system—that is, the signal defining the message signal blocks—and derives "receive pulses" c from a pulse edge of the bits of these message signal blocks. Line (c) in FIG. 3 shows two such receive pulses derived from the rising edge of the 1-bits of the message signal blocks (line (b)).

The arrangement illustrated in FIG. 1 further includes a phase comparator 4, to which are supplied, on the one hand, the above-mentioned receive pulses c and, on the other, the signals which determine the above-mentioned time intervals; i.e. the signals shown in FIG. 3 on lines (g1) to (i2). This phase comparator is designed so that, depending on whether a receive pulse falls into none of the time intervals, or into a certain one of these time intervals, it supplies a separate signal to an evaluating logic 5.

The circuit shown in FIG. 1 also comprises the station counter 8, which counts the pulses in the clock signal e delivered by the frequency divider 2. Since, in addition to the clock synchronization here discussed, the synchronization word of a message signal block is used to effect a block synchronization by means of other well-known apparatus not further specified here, the station counter 8 is able to provide a signal k, when in the state of block synchronism, which occurs together with the first bit of the synchronization word of a message signal block. Such a signal is shown in FIG. 3 on line (k).

Figure 2:
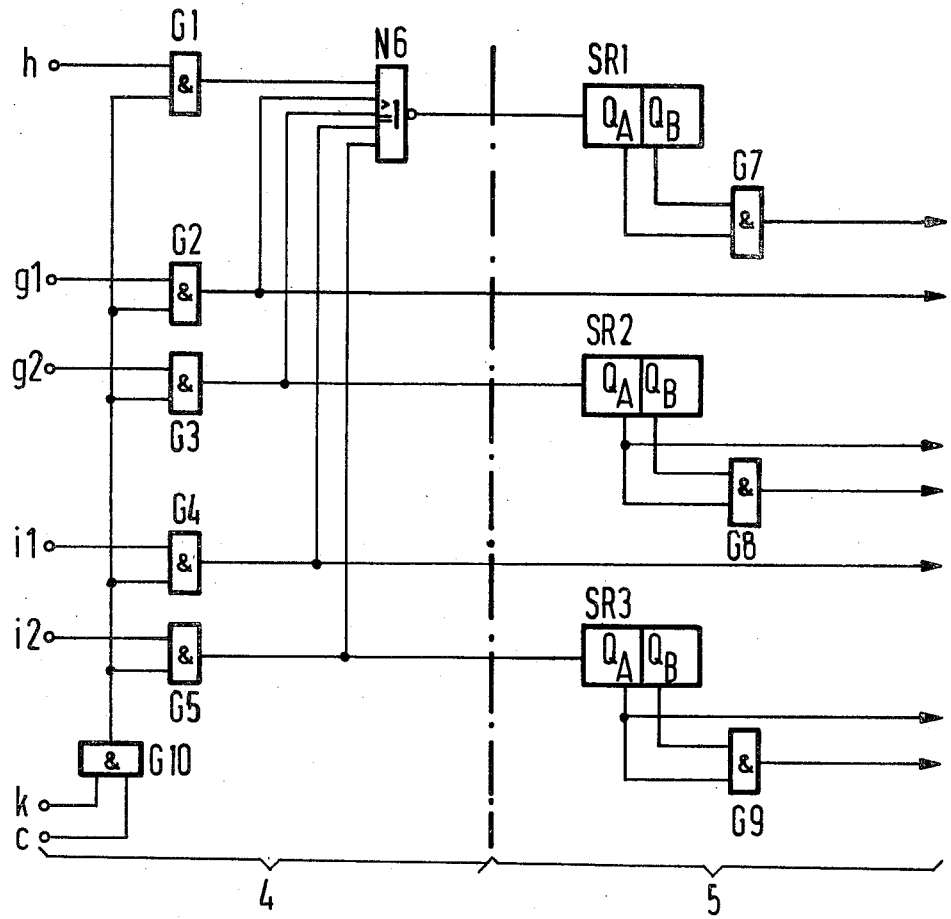
FIG. 2 is a schematic diagram of the specific parts of the circuit arrangements of FIG. 1 serving for phase comparison and evaluation of the phase comparison results.

The phase comparator 4 and the evaluating logic 5 are represented more specifically in FIG. 2. The left portion of the arrangement shown in FIG. 3, serving for phase comparison, comprises a number of coincidence (AND) gates G1 to G5 and G10 as well as a NOR gate N6. The first coincidence gate G10 links the receive pulses c with the above-mentioned gate signal k. In this way it is ensured that only those receive pulses are utilized for phase comparison which are derived from the first bit of the synchronization word of a received message signal block.

Of the remaining coincidence gates, gate G1 is associated with the time interval lying in the middle of a time interval group, as represented by the time pulse h. The other coincidence gates form two groups, of which the one comprising the gates G2 and G3 is associated with the two time intervals preceding the middle time interval within a group; namely, coincidence gate G2 with the time interval indirectly preceding per time pulse g1, and the coincidence gate G3 with the time interval directly preceding per time pulse g2. The group formed by the coincidence gates G3 and G5 is associated with the time intervals following the middle time interval within a time interval group; namely, coincidence gate G5 with the directly following time interval per time pulse i1, and coincidence gate G4 with the indirectly following time interval per time pulse i2.

The output of the first coincidence gate G10 is connected with one input of the coincidence gates G1 to G5. The respective other inputs of the coincidence gates G1 to G5 receive the signals (time pulses) designating the respective time intervals with which these coincidence gates are associated.

The outputs of the coincidence gates G1 to G5 are each connected with an input of the NOR gate N6.

The remaining right-hand part of the arrangement according to FIG. 2 comprises the evaluating logic which corresponds to the element 5 in FIG. 1. It includes three shift registers SR1 to SR3 and three coincidence gates G7 to G9. The first of these shift registers, SR1, is connected at its series input to the output of the NOR gate G6. The output QA of the first stage of this shift register as well as the output QB of another, subsequent stage are connected to the two inputs of the coincidence gate G7. The relative position of the shift register stage comprising the output QB depends, as will be explained later, upon how one is to proceed in a resynchronization after detection of completely undefined phase relationships.

The series input of the second shift register SR2 is connected to the output of the coincidence gate G3. This shift register delivers a signal, via the output QA of its first shift register stage, which serves to bring about a one-time shortening of the period of the bit clock signal f. The output QA of this first stage and the output QB of the second stage of the shift register SR2 are connected to the inputs of the coincidence gate G8, whose output signal is utilized to bring about a two-time (double) shortening of the bit clock period.

The shift register SR3 is connected at its series input to the output of the coincidence gate G5; it delivers a signal via its output QA which brings about a one-time lengthening of the bit clock period. This stage output and the output of the second shift register stage QB are connected to the inputs of the coincidence gate G9. When a signal is produced by this gate G9, the bit clock period is lengthened twice in succession.

The mode of operation of the circuit portion shown in FIG. 2 will now be described in detail: As has been indicated, the coincidence gate G10 produces an output signal solely on the basis of those receive pulses which are derived from the first bit of the synchronous word of a message signal block. If such a receive pulse, and hence the output signal of the coincidence gate G10, coincidence with none of the time intervals—that is, if the phase relationships are completely undefined—the coincidence condition will not be fulfilled at any one of the coincidence gates G1 to G5. As a result, the NOR gate N6 will produce a corresponding output signal in the form of a 1-bit, which is passed to the shift register SR1. As the coincidence condition of the coincidence gate G7 connected to the shift register outputs QA and QB is not yet fulfilled, this fact will at first have no consequences. If it is assumed that the further shift register stage with the output QB is the second stage of the shift register SR1, the missing coincidence detected in connection with the next following synchronization word will cause a second 1-bit to be entered into the shift register SR1 and the previously entered 1-bit to be shifted into this second stage. As a result, the coincidence gate G7 will deliver a signal which causes an initial phase equality between the bit clock signal and a receive pulse—preferably the receive pulse derived from the synchronization word—to be established. The distance between the shift register stages with the outputs QA and QB—that is, the number of transmit/receive periods which are awaited after detecting an asynchronism before a synchronization is effected—depends upon practical requirements as indicated above.

If the selected receive pulse falls into the middle time interval, per time pulse h shown on line (h) in FIG. 3, the coincidence condition is fulfilled only at the coincidence gate G1 (which receives the time pulse h) so that an output signal is not produced at any of the outputs of the evaluating logic. This means that, as is desired, the phase relationships remain unchanged; that is, phase fluctuations within the middle time range are disregarded.

If, however, such a selected receive pulse falls into a time interval directly adjacent to the middle time interval, for example in the directly preceding time interval per time pulse g2, the bit clock signal f generated in the subordinate system under consideration lags beyond the permitted amount. In this event, the coincidence condition is fulfilled at the coincidence gate G3, with the result that a 1-bit is entered into the shift register SR2. As has been indicated, this causes the shift register to produce a signal via output QA which causes the period of the bit clock signal to be shortened once. If, despite such a correction, upon comparison with the receive pulse derived from the next following synchronization word such a phase deviation is detected again, then a second 1-bit is entered into the shift register SR2 with the result that now a 1-bit occurs at both outputs QA and QB, thus fulfilling the coincidence condition of the coincidence gate G8. In this case, the gate G8 produces a signal which results in a double shortening of the period of the bit clock signal within one transmit/receive period.

If the phase comparator 4 should determine so great a phase deviation that the selected receive pulse falls into the time interval, per time pulse g1, indirectly preceding the middle time interval, then the coincidence condition of coincidence gate G2 is fulfilled. The output signal then produced by this coincidence gate brings about a three-time (triple) shortening of the bit clock period within the same transmit/receive period.

Corresponding conditions prevail when the bit clock signal generated in the subordinate system leads in relation to the bit clock of the superordinate system, used as the basis of the transmission of the arriving message signal blocks. In this case the selected receive pulse falls into a time interval following the middle time interval. When this occurs, signals are produced, via the output of the coincidence gate G5, the output QA of the shift register SR3, and via the output of the coincidence gates G9 or G4, which result in a one, two or three-time lengthening of the bit clock period within a transmit/receive period.

The time position of the bit clock periods, which are either shortened or lengthened, is actually of no importance for the functioning of the method according to the invention. Advantageously, however, bit clock periods are selected which lie at the beginning of the transmit/receive period since phase errors which exceed the limits here set are generally those which continuously increase. Consequently, after such a limit has been exceeded these phase errors should be avoided to the extent possible.

In the selection of the bit clock periods which are subjected to correction, however, care should be taken not to impair the function of circuits which are components of the respective subordinate system or are connected thereto, for example the circuits for analog-digital conversion and digital-analog conversion (the Codec) when the subordinate system is a digital subscriber station.

The length of the time intervals, as well as their number depend upon practical requirements, such as how large the phase fluctuations are anticipated to be and what frequency precision the clock generators, which determine the bit clock in the superordinate and subordinate systems, can be assumed to have.

There has thus been shown and described a novel method and circuit arrangement for clock synchronization in the transmission of digital information signals which fulfills all the objects and advantageous sought therefore. Many changes, modifications, variations and other uses and applications of the subject invention will, however, become apparent to those skilled in the art after considering this specification and the accompanying drawings which disclose preferred embodiments thereof. All such changes modifications, variations and other uses and applications which do not depart from the spirit and scope of the invention are deemed to be covered by the invention which is limited only by the claims which follow.

What is claimed is:

1. A method for clock synchronization in the transmission of digital message signals on a two-wire transmission line between a superordinate system, such as a PCM multi-multiplex exchange, and a subordinate system, such as a digital subscriber station, in the form of message signal blocks which comprise at least one message signal word and a prefixed synchronization word, each of said systems having a clock generator for producing a bit clock signal that determines the time relationships within the respective system, the two clock generators of the superordinate and subordinate systems operating plesiochronously to each other, said method comprising the steps at said subordinate system of:
    (a) deriving a periodically repeating time group comprising an odd number of directly succeeding time intervals from the bit clock signal of said subordinate system, the time interval occurring at the center of said time group coinciding with a pulse edge of said bit clock signal;
    (b) repeatedly deriving a receive pulse from the pulse edge of the first bit of said synchronization words in said message signal blocks received at said subordinate system;

(c) repeatedly determining by phase comparison whether the current receive pulse coincides with one of said time intervals; and (d) (1) if a prescribed number of successive receive pulses fail to coincide with any of said time intervals, establishing an initial phase equality between said bit clock signal of said subordinate system and said receive pulses;

(d) (2) if a receive pulse coincides with the middle time interval of a time group, leaving the phase of said bit clock signal unchanged;

(d) (3) if a receive pulse coincides with the time interval directly preceding said middle time interval of a time group, shortening the pulse period of said bit clock signal once, and if the next following receive pulse also coincides with the time interval directly preceding said middle time interval of the next following time group, shortening the pulse period of said bit clock signal twice within a transmission period;

(d) (4) if a receive pulse coincides with the time interval directly following said middle time interval of a time group, lengthening the pulse period of said bit clock signal once, and if the next following receive pulse also coincides with the time interval directly following said middle time interval of the next following time group, lengthening the pulse period of said bit clock signal twice within a transmission period;

(d) (5) if a receive pulse coincides with one of the time intervals indirectly preceding said middle time interval of a time group, shortening the pulse period of said bit clock signal at least three times within a transmission period upon the first detection of such phase relationship, said number of times depending upon which one of said time intervals said receive pulse coincides with; and (d) (6) if a receive pulse coincides with one of the time intervals indirectly following said middle time intervals indirectly following said middle time interval of a time group, lengthening the pulse period of said bit clock signal at least three times within a transmission period upon the first detection of such phase relationship, said number of times depending upon which one of said time intervals said receive pulse coincides with.

2. A circuit arrangement for clock synchronization in the transmission of digital message signals on a two-wire transmission line between a superordinate system, such as a PCM time-multiplex exchange, and a subordinate system, such as a digital subscriber station, in the form of message signal blocks which comprise at least one message signal word and a prefixed synchronization word, each of said systems having a clock generator for producing a bit clock signal that determines the time relationships within the respective system, the two clock generators of the superordinate and subordinate systems operating plesiochronously to each other, said circuit arrangement being disposed in said subordinate system and comprising, in combination:

(a) means for deriving a periodically repeating group of time pulses representing an odd number of directly succeeding time intervals from the bit clock signal of said subordinate system, the time interval occurring at the center of said time group coinciding with a pulse edge of said bit clock signal;

(b) means for repeatedly deriving a receive pulse from the pulse edge of the first bit of said synchronization words in said message signal blocks received at said subordinate system;

(c) means for repeatedly determining by phase comparison whether the current receive pulse coincides with one of said time intervals; and (d) evaluating logic means responsive to said phase comparison means for:

(1) if a prescribed number of successive receive pulses fail to coincide with any of said time intervals, establishing an initial phase equality between said bit clock signal of said subordinate system and said receive pulses;

(2) if a receive pulse coincides with the middle time interval of a time group, leaving the phase of said bit clock signal unchanged;

(3) if a receive pulse coincides with the time interval directly preceding said middle time interval of a time group, shortening the pulse period of said bit clock signal once, and if the next following receive pulse also coincides with the time interval directly preceding said middle interval of the next following time group, shortening the pulse period of said bit clock signal twice within a transmission period;

(4) if a receive pulse coincides with the time interval directly following said middle time interval of a time group, lengthening the pulse period of said bit clock signal once, and if the next following receive pulse also coincides with the time interval directly following said middle time interval of the next following time group, lengthening the pulse period of said bit clock signal twice within a transmission period;

(5) if a receive pulse coincides with one of the time intervals indirectly preceding said middle time interval of a time group, shortening the pulse period of said bit clock signal at least three times within a transmission period upon the first detection of such phase relationship, said number of times depending upon which one of said time intervals said receive pulse coincides with; and (6) if a receive pulse coincides with one of the time intervals indirectly following said middle time interval of a time group, lengthening the pulse period of said bit clock signal at least three times within a transmission period upon the first detection of such phase relationship, said number of times depending upon which one of said time intervals said receive pulse coincides with.

3. The circuit arrangement defined in claim 2, wherein said receive pulse deriving means include means for deriving an intermediate receive pulse from a pulse edge of the bits of said message signal blocks, means for producing a time signal in synchronism with the first bit of each synchronization word, and coincidence gate means for producing said receive pulse upon simultaneous occurrence of said intermediate receive pulse and said timing signal.

4. The circuit arrangement defined in claim 3, wherein said phase comparison means includes a plurality of coincidence gates, each having first and second inputs and an output, and a NOR gate connected to the output each of said coincidence gates, the first input of each coincidence gate being connected to the output of said coincidence gate means and receiving said receive pulse, the second input of each of said coincidence gates receiving a different one of said time pulses representing said time intervals.

5. The circuit arrangement defined in claim 4, wherein said evaluating logic means comprises:
(1) a first shift register having a series input connected to said NOR gate and at least two stages, the distance between said two stages depending upon the number of synchronization words which are to be received before establishing said initial phase equality;
(2) a first coincidence gate, having two inputs connected to the outputs of said two stages of said first shift register, for producing a signal for effecting said initial phase equality;
(3) a second shift register having a series input connected to the output of one of said coincidence gates which receives a time pulse representing a time interval directly preceding said middle time interval, said second shift register having at least two stages, the output of said first stage effecting a one-time shortening of the pulse period of said bit clock signal;
(4) a second coincidence gate having two inputs connected to the outputs of said two stages of said second shift register, respectively, and having an output for effecting a two-time shortening of the pulse period of said bit clock signal upon receipt of signals at both inputs;
(5) a third shift register hving a series input connected to the output of one of said coincidence gates which receives a time pulse representing a time interval directly following said middle time interval, said third shift register having at least two stages, the output of said first stage effecting a one-time lengthening of the pulse period of said bit clock signal;
(6) a third coincidence gate having two inputs connected to the outputs of said two stages of said third shift register, respectively, and having an output for effecting a two-time lengthening of the pulse period of said bit clock signal upon receipt of signals at both inputs;
(7) a first additional output, connected to one of said coincidence gates which receive time pulses representing a time interval indirectly preceding said middle time interval, for producing an output which effects a three-time shortening of the pulse period of said bit clock signal; and
(8) a second additional output, connected to one of said coincidence gates which receive time pulses representing a time interval indirectly preceding said middle time interval, for producing an output which effects a three-time shortening of the pulse period of said bit clock signal.

* * * * *